Sept. 23, 1958 J. SHAPIRO 2,853,124
COMBINATION PORTABLE VENTILATED SEAT CUSHION AND
VENTILATED BACK CUSHION FOR MOTOR VEHICLE
SEATS, ETC., AND PROCESS OF MAKING SAME
Filed Sept. 27, 1957
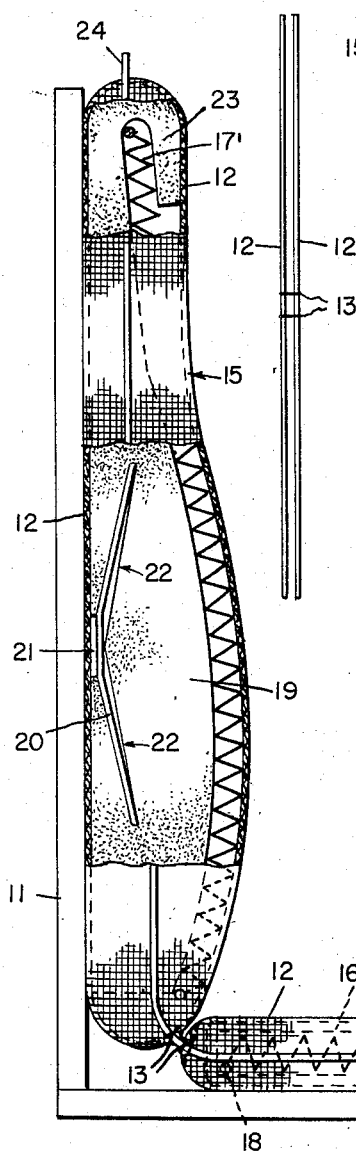
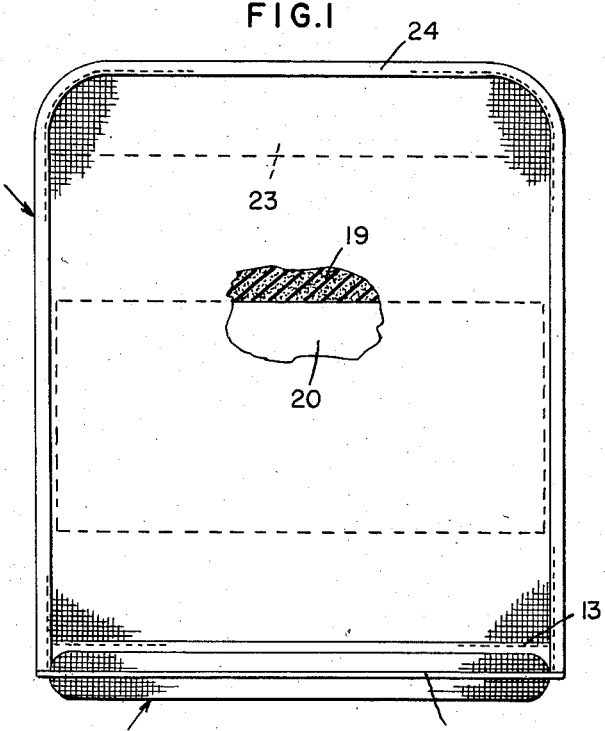
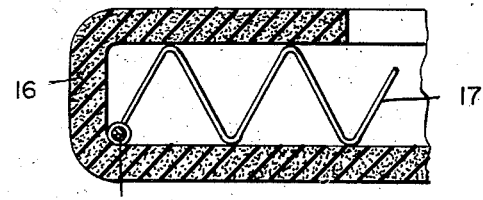
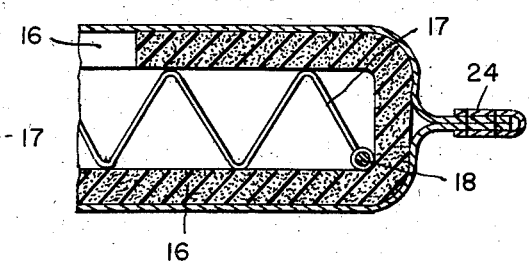
INVENTOR.
Jacob Shapiro
BY
Harvey & Harvey
ATTYS

United States Patent Office 2,853,124
Patented Sept. 23, 1958

2,853,124

COMBINATION PORTABLE VENTILATED SEAT CUSHION AND VENTILATED BACK CUSHION FOR MOTOR VEHICLE SEATS, ETC., AND PROCESS OF MAKING SAME

Jacob Shapiro, Baltimore, Md.

Application September 27, 1957, Serial No. 686,606

7 Claims. (Cl. 155—182)

The present invention is an improvement on the back rest of my Patent No. 2,769,485, issued November 6, 1956, and the further embodiment included in my application, filed January 17, 1957, Serial Number 634,689, and has for an object to combine a reinforced back rest, made in accordance with the teaching of my invention, with the popular ventilated yieldable seat and back cushions presently used on motor vehicle seats and the like.

Other objects of the invention are to merge the advantages of the ventilated yieldable back cushion with the reinforced back rest of my invention to obtain the unitary end result of air conditioning the back while obtaining the orthopedic results which flow from supporting the lumbo-sacral spine; to provide the present combination by strategically positioning my back rest in the porous spring-carrying back cushion; to include in the combination a yieldable cup for the spring of the seat cushion, to supplement the cushioning characteristics of this part of the combination, but of more importance to reinforce the portion of the cushion, at vulnerable areas, to prevent damage to seat fabrics through spring friction and to prevent protrusion of the spring, with its resultant clothes damage to the cushion user; and to provide a combination portable ventilated seat cushion and ventilated back rest which is practical for use on virtually all types of motor vehicle seats, chairs, etc., and which will greatly increase the longevity of present ventilated seat cushions in addition to increasing the utilitarian functions of the cushion.

A further object of this invention is the novel method of combining a ventilated seat and back cushion with a rubber body to further increase the cushioning characteristics and to reduce frictional resistance of the spring-filled cushion on the seat to a minimum, in addition to containing any broken parts of the spring in the seat.

Other objects of the invention will be manifest from the following description of the present preferred form of the invention, taken in connection with the accompanying drawings, wherein:

Fig. 1 is a front elevational view of a combination seat cushion and back cushion constructed in accordance with this invention, a part of the back cushion being broken away to disclose details;

Fig. 2 is a fragmentary side elevational view of the cushion of the present invention, illustrating its application, parts thereof being broken away to disclose details;

Fig. 3 is a detail enlarged fragmentary sectional view taken through the front part of the seat cushion showing the manner in which the rubber cup is mounted in the seat portion of the cushion and curled over the margins of the spring unit;

Fig. 4 is a side elevational view of the blanks which form the cover part of the cushion; and Fig. 5 is a fragmentary top plan view of the spring carry cup used in the seat part of the cushion.

To illustrate the application of this invention, I have, in Fig. 2, shown a portion of a conventional seat which includes a horizontal seat portion 10 and a vertical back portion 11. The apparatus and process of the present invention includes the use of a pair of blank twin panels 12 made of reticulated or porous material which will permit the free passage of air therethrough. Approximately midway their ends, the panels are stitched together. I use a double row of stitching 13 spaced approximately one-half inch apart, to provide a joint for a purpose which will be hereinafter apparent. The panels may be initially laid on a horizontal support and a spring-carrying rubber body positioned between the panels at each side of the line 13 of stitching, following which the free margins of the panels are sewed together to provide substantially twin compartments. One compartment, generally designated 14, constitutes the seat cushion and the other compartment, generally designated 15, constitutes the back cushion. The spring carrying rubber body of the seat compartment 14 comprises a synthetic rubber cup or case 16 in which a spring unit 17 is mounted. The spring unit is conventional and consists of a substantially rectangular frame 18 which is engaged by a coil spring in a manner well known in the art. As shown to advantage in Figs. 2, 3 and 5, the bottom of the cup 16 lies beneath the spring unit 17 and on top of the base portion of the seat cover. The upper margin of the cup extends around and over the perimeter of the spring unit 17 so as to completely encase the marginal edges of the unit.

The back compartment 15 of the cushion also carries a spring unit indicated at 17' which is identical in construction to the unit 17 but is contoured to complement the shape of a rubber body with which it is engaged. Experiments have shown that it is possible to use the back rest of my Patent No. 2,769,485 or the further embodiment shown in my application, Serial Number 634,689 in the seat back cushion compartment, as illustrated in Fig. 2. The back rest includes a synthetic rubber body 19 which is under the spring unit 17' during fabrication of the cushion and lies in back of the spring when manufacture has been completed and the cushion is in use on a seat. The body 16 is formed of polyurethane or other synthetic rubber and is of a size and shape substantially as shown in the drawing, being thickened at the point where it engages the lumbo-sacral spine and equipped with a floating metal yieldable plate 20, the upper and lower edges of which are bent forwardly. Where unmoldable synthetic rubber is used, it is necessary that the back of the rubber body 19 be provided with a slit 21 which communicates with interstices 22 extending at an angle above and below the slit 21. Where moldable rubber is used, the plate 20 may of course be molded in the rubber body. The upper end of the rubber body is reduced, as indicated at 23 and encases the upper terminal of the spring unit 17' including the sides of the latter, adjacent the top. After the spring-carrying rubber body has been engaged between the parallel portions of the panels 12 on opposite sides of the stitching 13, the edges of the panels are sewed together in a manner to provide a selvage 24.

I have found that a cushion constructed in accordance with the teaching of this invention results in the retention of the desirable air-conditioning characteristics of spring-filled cushions and eliminates many of the disadvantages of these cushions which include, inter alia, damage to seats, including seat fabrics and seat covers by the friction generated through movement of the spring filled cushion over the seat during use of the cushion, especially in motor vehicles; eliminates breakthrough of the springs in the cushion covers and provides a better overall cushioning effect in both the seat and back portions of the cushion, in conjunction with which the user of the cushion automatically receives the orthopedic benefits resulting from supporting the lumbo-sacral spine by use of the synthetic rubber body in the back cushion, with the floating plate of my invention mounted therein.

While I have herein described a preferred embodiment of my invention, it is nevertheless to be understood that various changes may be made therein, without departing from the spirit and scope of the claims hereto appended.

What I claim is:

1. A portable ventilated seat cushion comprising a porous two-compartment cover, each carrying a spring for distending the cover, and a yieldable body engageable inside of each cover part in contiguity to the spring of its part.

2. The combination of claim 1 wherein one of the yieldable bodies comprises a synthetic rubber unit and a floating plate.

3. A combination portable ventilated seat cushion and ventilated back cushion including a porous two-compartment cover, one compartment being engageable with a seat and the other compartment engageable with the back of the seat, a convoluted spring unit in each compartment for holding the cover distended, and a reinforced rubber body mounted in the compartment of the cover which engages the seat back, said body being positioned aft of the spring unit in said compartment.

4. The combination of claim 3 with the addition of a rubber cup mounted in the compartment of the cover which engages the seat proper, the cup being adapted for the reception of the spring unit in said last-mentioned compartment.

5. The method of making a ventilated seat and back cushion which comprises superimposing twin elongated blanks of porous material and sewing the blanks together, approximately midway their ends, after which a spring carrying rubber body is positioned between the blanks of each side of the line of sewing followed by sewing the free margins of the blanks together.

6. A ventilated cushion comprising a porous casing, an elastic body mounted in the casing including a rubber-like part with a floating plate and a convoluted spring in contiguity with one face of said rubber-like part.

7. The cushion of claim 6 wherein the elastic body is an entity including a rubber-like part extending from the top to the bottom of the porous casing and equipped with a central plate, the entity also including a spring interposed between one face of said rubber-like part and a wall of the casing.

References Cited in the file of this patent

UNITED STATES PATENTS

| | | |
|---|---|---|
| 2,129,353 | Harley | Sept. 6, 1938 |
| 2,769,485 | Shapiro | Nov. 6, 1956 |